(12) United States Patent
Mansfield (10) Patent No.: US 9,989,145 B2
(45) Date of Patent: Jun. 5, 2018

(54) DRIVE SELECTOR

(71) Applicant: Club Car, LLC, Evans, GA (US)

(72) Inventor: Richard Marcus Mansfield, North Augusta, SC (US)

(73) Assignee: Club Car, LLC, Evans, GA (US)

( * ) Notice: Subject to any disclaimer, the term of this patent is extended or adjusted under 35 U.S.C. 154(b) by 697 days.

(21) Appl. No.: 14/513,360

(22) Filed: Oct. 14, 2014

(65) Prior Publication Data

US 2015/0101438 A1   Apr. 16, 2015

Related U.S. Application Data

(60) Provisional application No. 61/890,842, filed on Oct. 14, 2013.

(51) Int. Cl.
*F16H 59/08* (2006.01)
*F16H 53/06* (2006.01)
*F16H 53/00* (2006.01)

(52) U.S. Cl.
CPC ............. *F16H 59/08* (2013.01); *F16H 53/00* (2013.01); *F16H 53/06* (2013.01); *F16H 2059/088* (2013.01); *Y10T 74/2011* (2015.01)

(58) Field of Classification Search
CPC .................................. F16H 59/08; F16H 53/06
See application file for complete search history.

(56) References Cited

U.S. PATENT DOCUMENTS

| | | | | |
|---|---|---|---|---|
| 2,123,183 | A | * | 7/1938 | Ekstromer ............... F04B 47/04 417/415 |
| 3,398,904 | A | * | 8/1968 | Adams .................. B01D 29/111 242/157 R |
| 3,492,880 | A | * | 2/1970 | Pearson ............... F16K 31/1635 251/58 |
| 4,170,149 | A | | 10/1979 | Koegel |
| 4,299,134 | A | | 11/1981 | Roy et al. |
| 4,579,204 | A | | 4/1986 | Iio |
| 5,006,084 | A | | 4/1991 | Handa |
| 5,027,673 | A | | 7/1991 | Behrens et al. |
| 5,027,931 | A | | 7/1991 | Ratke et al. |
| 5,103,857 | A | * | 4/1992 | Kuhn ...................... F16K 21/04 137/315.13 |
| 5,187,998 | A | | 2/1993 | Asano et al. |

(Continued)

FOREIGN PATENT DOCUMENTS

| | | |
|---|---|---|
| EP | 1571374 B1 | 7/2009 |
| GB | 1473844 | 5/1977 |

OTHER PUBLICATIONS

International Search Report in corresponding PCT application (i.e., PCT/US14/60460), dated Jan. 8, 2015 (8 pages).

*Primary Examiner* — Terence Boes
(74) *Attorney, Agent, or Firm* — Taft, Stettinius & Hollister LLP (57) ABSTRACT

An exemplary drive selector includes a housing, a cam positioned in the housing, a follower coupled to a shaft and in contact with the cam, and a biasing member urging the cam toward the follower. One of the cam and the follower includes at least one protrusion, and the other of the cam and the follower includes a plurality of recesses configured to receive the protrusion. When the protrusion is received in the recess, the force provided by the biasing member resists relative rotation of the cam and the follower.

22 Claims, 6 Drawing Sheets

(56) References Cited

U.S. PATENT DOCUMENTS 5,406,860 A    4/1995   Easton et al.
5,845,536 A    12/1998  Certeza
6,691,816 B2   2/2004   Houston

* cited by examiner

DRIVE SELECTOR

CROSS-REFERENCE TO RELATED APPLICATION

This application claims the benefit of U.S. Provisional Application No. 61/890,842, filed Oct. 14, 2013, which is incorporated herein by reference in its entirety.

TECHNICAL FIELD

The present invention generally relates to vehicle drive selector systems, and more particularly, but not exclusively, to Forward-Neutral-Reverse drive selector systems for vehicles such as golf cars and utility vehicles.

BACKGROUND

Conventional Forward-Neutral-Reverse drive selectors for vehicles such as golf cars and utility vehicles suffer from a variety of limitations and disadvantages. For example, many conventional systems do not include features to maintain the user's gear selection, or to impact the user's shifting effort. Certain conventional drive selector systems include a gated shifter slot in the vehicle dash. In addition to being aesthetically displeasing, these gated slots do not contribute tactile feedback to the operator, but simply set the allowed positions of the shifter lever. An additional disadvantage of such systems is the extra positional tolerance requirements for the slot relative to the handle.

Forward-Neutral-Reverse selector systems often utilize a pin or dog-clutch system to selectively engage the drive axle, thereby establishing forward or reverse operation of the vehicle. Dog-clutch systems such as this are only operable in a number of discrete positions in which the dogs are properly aligned. If the dogs are not aligned, the transmission may not shift to the intended gear until the engine begins running (commonly referred to as "dead-head"). There is a need for the unique and inventive gear-shifting apparatuses, systems and methods disclosed herein.

SUMMARY

An exemplary drive selector includes a housing, a cam positioned in the housing, a follower coupled to a shaft and in contact with the cam, and a biasing member urging the cam toward the follower. One of the cam and the follower includes at least one protrusion, and the other of the cam and the follower includes a plurality of recesses configured to receive the protrusion. When the protrusion is received in the recess, the force provided by the biasing member resists relative rotation of the cam and the follower. Further embodiments, forms, features, aspects, benefits, and advantages of the present application shall become apparent from the description and figures provided herewith.

DETAILED DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
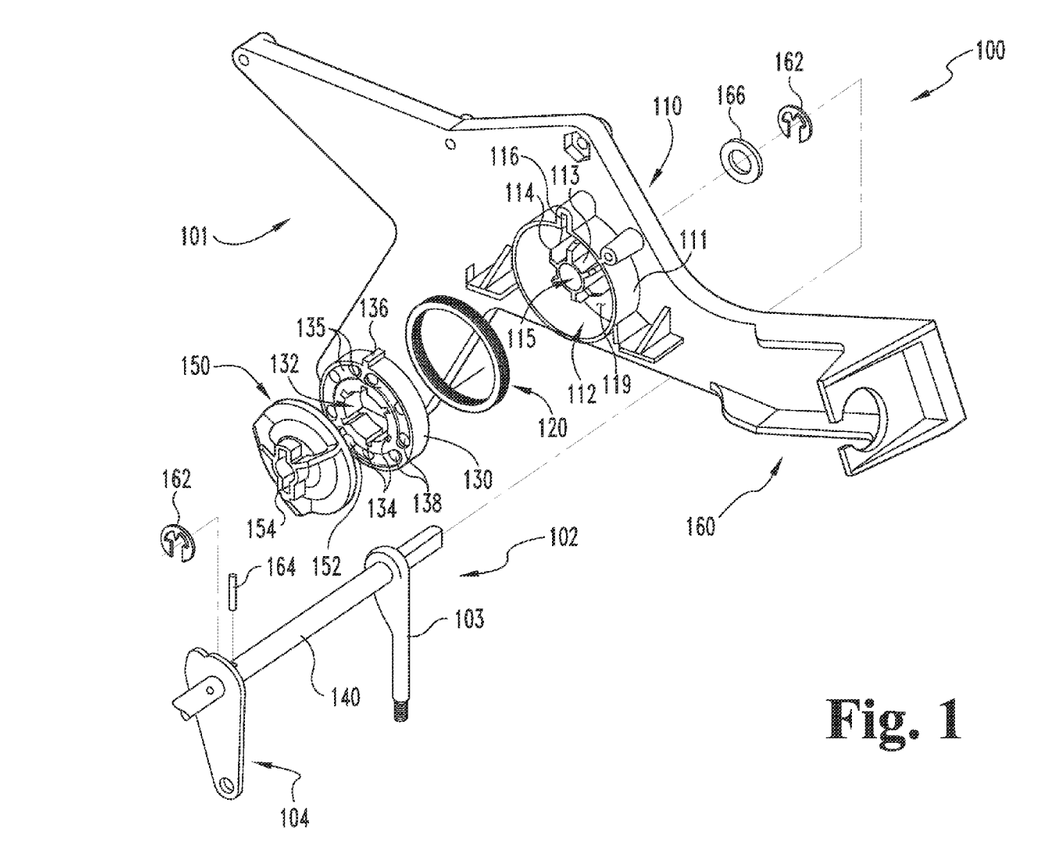
FIG. 1 illustrates an exploded view of a selector system according to an embodiment of the invention.
Figure 2:
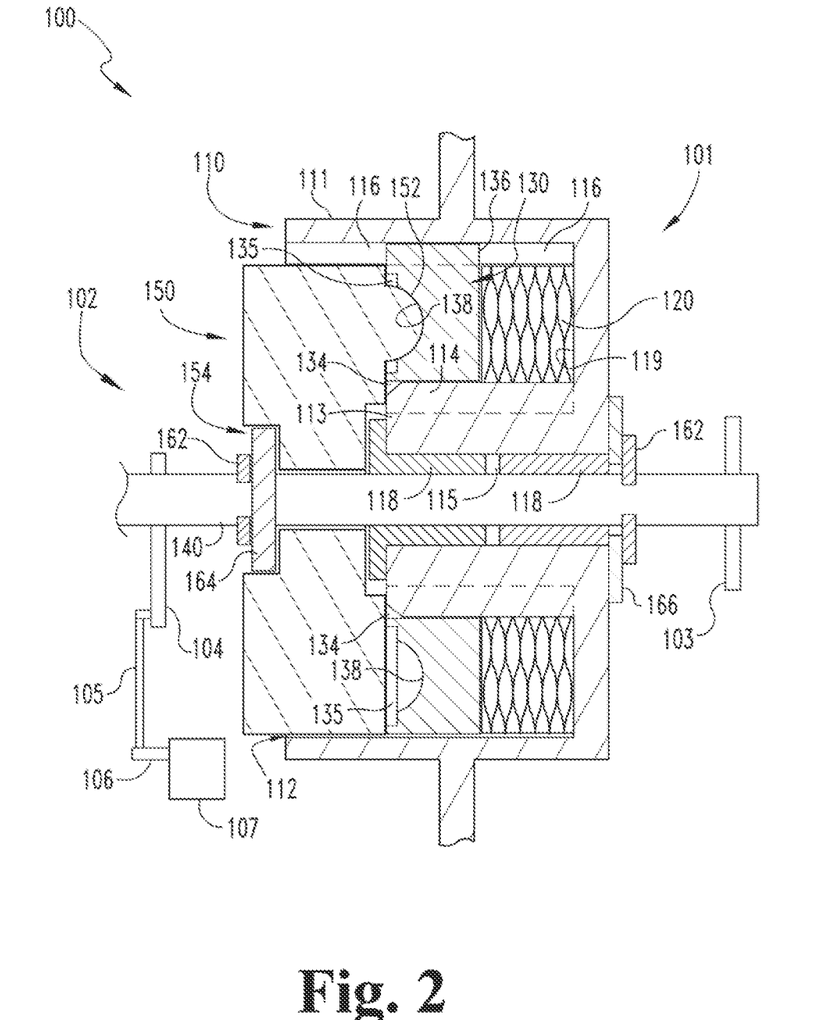
FIG. 2 is a cross-sectional illustration of the selector system of FIG. 1.

With reference to FIGS. 1 and 2, an exemplary selector system 100 includes a housing assembly 101 and a shaft assembly 102 rotatably coupled to the housing assembly 101. The housing assembly 101 includes a housing 110, a biasing member 120, and a cam 130. The shaft assembly 102 includes an input crank 103, an output crank 104, a shaft 140, and a follower 150. The selector system 100 may further include a push/pull cable 105 connecting the output crank 104 to a shift lever 106 of a vehicle's transmission 107. In certain embodiments, the shift lever 106 may be a resilient shift lever, such as that disclosed in the commonly-owned co-pending application entitled SELF-PRELOADING SHIFT LEVER, filed Oct. 14, 2013 (U.S. Provisional Patent Application No. 61/890,817.

The exemplary selector system 100 is configured to be installed in a land vehicle or watercraft such as, for example, a golf cart, utility vehicle, boat, or the like. In the illustrated form, the transmission 107 is operable in Forward, Neutral, and Reverse modes, each corresponding to a different discrete position of the shift lever 106. A user selects the operating mode by operating the selector system 100 as described below, thereby moving the shift lever 106 to one of the three discrete positions. Other forms are also contemplated, such as forms enabling the user to select between a plurality of gearing ratios (e.g. first gear, second gear, and third gear). While the illustrated selector system is configured for use in a land vehicle, it is also contemplated that the selector system 100 may be installed in a watercraft such as a boat, or that the selector system 100 may be utilized in non-vehicular applications.

The housing 110 includes a cavity 112 defined by an outer body 111, an inner body 113, and a rear wall 119. The inner body 113 may include radially-extending splines 114 and an opening 115, and the outer body 111 may include an axial channel 116. Disposed within the opening 115 are bushings 118, which provide a bearing surface against which the shaft 140 may rotate. The housing 110 may also include a mounting structure 160 to which an outer sheath of the cable 105 may be coupled, and/or mounting features by which the selector system 100 may be coupled to the vehicle or other structure.

The biasing member 120 is positioned within the cavity 112 between the rear wall 119 and the cam 130, and is configured to bias the cam 130 axially outward (i.e. away from the rear wall 119 and toward the follower 150). In the illustrated embodiment, the biasing member 120 is a single wave spring, although other forms are contemplated. For example, in certain embodiments, the biasing member 120 may comprise one or more helical compression springs.

Figure 3:
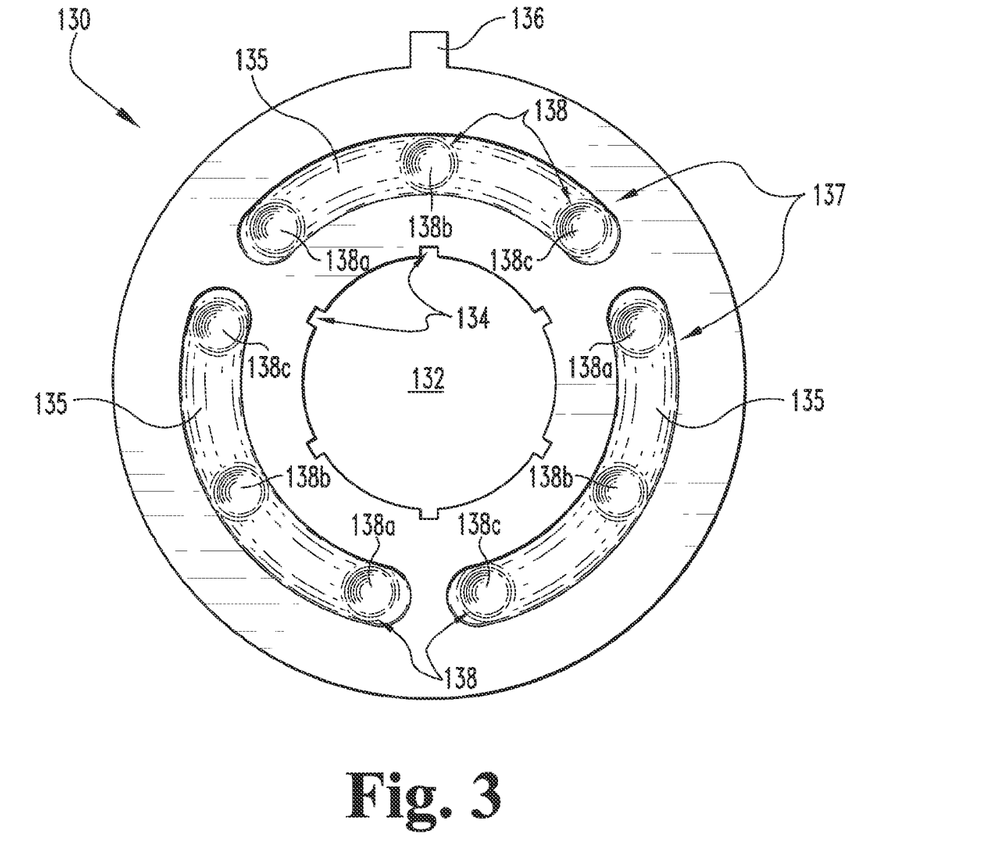
FIG. 3 is an elevational view of a cam according to an embodiment of the invention.

With additional reference to FIG. 3, the cam 130 includes a plurality of arcuate grooves 135, each including a recess group 137 comprising a plurality of recesses 138. While the illustrated cam 130 includes three grooves 135, it is also contemplated that more or fewer may be utilized. In the illustrated form, each recess 138 includes a concave arcuate surface, and each group of recesses includes a first recess 138a, a second recess 138b, and a third recess 138c. In other embodiments, the recess group 137 in each groove 135 may include more or fewer recesses 138, one or more of which may be of another configuration. By way of non-limiting example, one or more of the recesses 138 may include a rectilinear tapered surface, or the concave surface may comprise a valley-like depression (for example defining a portion of a cylinder or a portion of a frustum of a cone).

The cam 130 is disposed within the cavity 112 between the biasing member 120 and the follower 150, and includes an opening 132 configured to receive the inner body 113. In the illustrated embodiment, the cam 130 further includes interior notches 134 and an exterior spline 136. The notches 134 are each configured to slidingly receive one of the splines 114, such that the cam 130 is axially movable and rotationally fixed with respect to the housing 110. The spline 136 is configured to be received by the axial channel 116, ensuring proper alignment of the cam 130 during installation. It is also contemplated that the locations of the axial channel 116 and the spline 136 may be reversed—that is to say, a spline may be formed on the interior of the outer body 111, and an axial channel may be formed on the exterior of the cam 130. It is further contemplated that one or more of the notches may instead be formed on the inner body 113, and that the corresponding spline may be formed on the cam 130. For example, the exterior of the inner body 113 may include a single notch, and the interior of the cam 130 may include a single spline; in such embodiments, the illustrated spline 136 and axial channel 116 may not be included, as the cam's interior spline would provide the aligning functionality. Furthermore, certain embodiments may employ additional or alternative features which provide the cam 130 with the variable axial and fixed angular positions with respect to the housing 110.

The shaft 140 is coupled to an input crank 103, which is configured to translate a force from a user to a torque on the shaft 140. For example, the input crank 103 may include or be coupled to a handle or knob which the user operates to actuate the input crank 103. The input crank 103 is coupled to the shaft 140 via an interface that is generic enough to allow use of different handles as the input crank 103. While the exemplary input crank 103 is connected directly to the shaft 140, it is also contemplated that the input crank 103 may transmit torque to the shaft 140 indirectly. For example, the input crank 103 may be coupled to the follower 150, which would then transmit the torque to the shaft 140.

The shaft 140 is also coupled to an output crank 104, which is connected to the shift lever 106 by the push/pull cable 105, such that the position of the shift lever 106 corresponds to that of the output crank 104. Thus, by adjusting the position of the input crank 103 (thereby adjusting the position of the shift lever 106 via the output crank 104 and the cable 105), the user can select the operating mode of the vehicle. The output crank may 104 also engage one or more sensors (not illustrated) in the vehicle's electric system. For instance, the sensors may include a plurality of micro-switches, and the electrical system may prevent the vehicle from starting if the output crank 104 is in a position corresponding to the Neutral configuration of the transmission 107.

In the exemplary embodiment, the shaft 140 is coupled to the input crank 103 at one end, and to the output crank 104 at the opposite end. In certain embodiments, the input crank 103 and the output crank 104 may be coupled to the same end of the shaft 140. In further embodiments, the input crank 103 and the output crank 104 may be integrally formed with one another and/or the shaft 140. In other embodiments, one or more of the input crank 103 and the output crank 104 may be coupled to another element of the shaft assembly 102, such as the follower 150.

The shaft 140 extends through the housing opening 115 and the bushings 118, and is held in place by snap rings 162 which prevent axial movement of the shaft 140. In some embodiments a washer 166 or the like may also be utilized with the shaft assembly 102. The shaft 140 also extends through an opening 154 in the follower 150. The illustrated opening 154 is configured to receive both the shaft 140 and a pin 164 which rotationally couples the shaft 140 and the follower 150. Other forms of rotational coupling are also contemplated, such as splines and notches similar to those described with respect to the housing 110 and the cam 130. In certain embodiments, the follower 150 may be integrally formed with the shaft 140.

The illustrative follower 150 includes a plurality of protrusions 152 configured to be received in the recesses 138. The protrusions 152 are positioned on the follower 150 such that when one protrusion 152 is received in a recess 138 of a first recess group 137, each of the other protrusions 152 is received in the corresponding recess 138 in the other groups 137. For example, when a first protrusion 152 is received in one of the first recesses 138a, the other protrusions 152 are received in the other first recesses 138a. The rotational range of each protrusion 152 is limited by the walls of the groove 135, such that each protrusion is associated with only one of the recess groups 137.

When each of the protrusions 152 is received within a recess 138, the preloading force provided by the biasing member 120 causes the cam 130 to resist rotation of the follower 150 due to the interaction between the surfaces of the protrusions 152 and recesses 138. The geometries of the protrusions 152 and recesses 138 are such that, when a protrusion 152 is received in a recess 138, rotation of the follower 150 with respect to the cam 130 is prevented unless a threshold torque is applied to the follower 150. When a user applies a threshold force (i.e. to the input crank 103) sufficient to supply the threshold torque to the follower 150, the protrusions 152 travel along the surfaces of the recesses 138, urging the cam 130 away from the follower 150 against the force of the biasing member 120.

In the illustrated embodiment, the protrusions 152 comprise a convex surface, and the recesses 138 comprise a concave surface. More particularly, the illustrated protrusions 152 are substantially hemispherical in geometry, and the recesses 138 comprise a portion of a sphere. It is also contemplated that one or more of the protrusions 152 and/or the recesses 138 may be of a different geometry, so long as the geometries selectively prevent rotation of the follower 150 as described above. For example, one or more of the protrusions 152 and/or the recesses 138 may include a flat surface and curved or tapered sides. In certain embodiments, one or more of the protrusions 152 may include roller elements, such as spherical or cylindrical rollers.

In the exemplary form, the follower 150 includes three protrusions 152, corresponding to the three grooves 135 including the three recess groups 137. Other embodiments may employ more or fewer grooves 135, recess groups 137, and/or protrusions 152. While the exemplary protrusions 152 are formed on the follower 150 and the recesses 138 are formed on the cam 130, it is also contemplated that one or more protrusion 152 may instead be formed on the cam 130, and the corresponding groove 135 and recess group 137 may be formed on the follower 150.

Due to the above-described interaction between the protrusions 152 and the recesses 138, the shaft assembly 102 is operable in a number of discrete positions corresponding to the number of recesses 138 in each groove 135. These discrete positions correspond to the positions of the shift lever 106 in which the dogs are aligned, such that the transmission 106 operates in the selected gear.

In the illustrated form, the shaft assembly 102 is operable in three discrete positions. In a first discrete position, the protrusions 152 are received in the first recesses 138a, and the shift lever 106 is in a position corresponding to the Forward mode of the transmission 107. In a second discrete position, the protrusions 152 are received in the second recesses 138b, and the shift lever 106 is in a position corresponding to the Neutral mode of the transmission 107. In a third discrete position, the protrusions 152 are received in the third recesses 138c, and the shift 106 lever is in a position corresponding to the Reverse mode of the transmission 107. It is also contemplated that the transmission 106 may be operable in additional or alternative modes. Furthermore, while the illustrated selector system 100 is operable in three discrete positions corresponding to the Forward, Neutral, and Reverse configurations, other embodiments may be operable in more or fewer discrete positions corresponding to the additional or alternative configurations of the transmission 107.

When operating the selector system 100, a user applies a force to the input crank 103. If the shaft assembly 102 is in one of the discrete positions, the input crank 103 will not move until the user applies the threshold force to the input crank 103. In other words, the input crank 103 provides a resistive force which the user must overcome in order to rotate the shaft assembly 102. This force feedback alerts the user that the shaft assembly 102 is currently in one of the discrete positions, and also reduces the likelihood of unintentional gear shifting.

Upon applying the threshold force, rotation of the follower 150 causes the protrusions 152 to urge the cam 130 toward the rear wall 119 until the protrusions 152 are no longer received by the recesses 138 (e.g. the first recesses 138a), and instead engage the surfaces of the grooves 135. The user then continues to apply a force (which may be below the threshold force) to the input crank 103, causing further rotation of the follower 150. As the follower 150 continues to rotate, the protrusions 152 slide along the surfaces of the grooves 135 until the shaft assembly 102 approaches another of the discrete positions.

As the protrusions 152 approach alignment with another set of recesses 138 (e.g. the second recesses 138b), the biasing member 120 continues to urge the cam 130 against the follower 150. When the protrusions 152 becomes sufficiently aligned with the recesses 138, the preloading force of the biasing member 120, in combination with the geometries of the protrusions 152 and recesses 138, causes the cam 130 to exert a radial force on the follower 150. The radial force causes a slight "jump" in the rotation of the shaft assembly 102 as the protrusions 152 slide into the recesses 138. This "jump" provides tactile feedback to the user via the input crank 103, indicating that the new discrete position—and thus the new mode of the transmission 107—has been selected. In order to change the gear, the user must again apply the threshold force to the input crank 103. If a user attempts to urge the input crank 103 beyond one of the terminal discrete positions (e.g. past the Forward or Reverse position), the protrusions 152 contact the walls of the groove 135, preventing further rotation of the follower 150.

Figure 4:
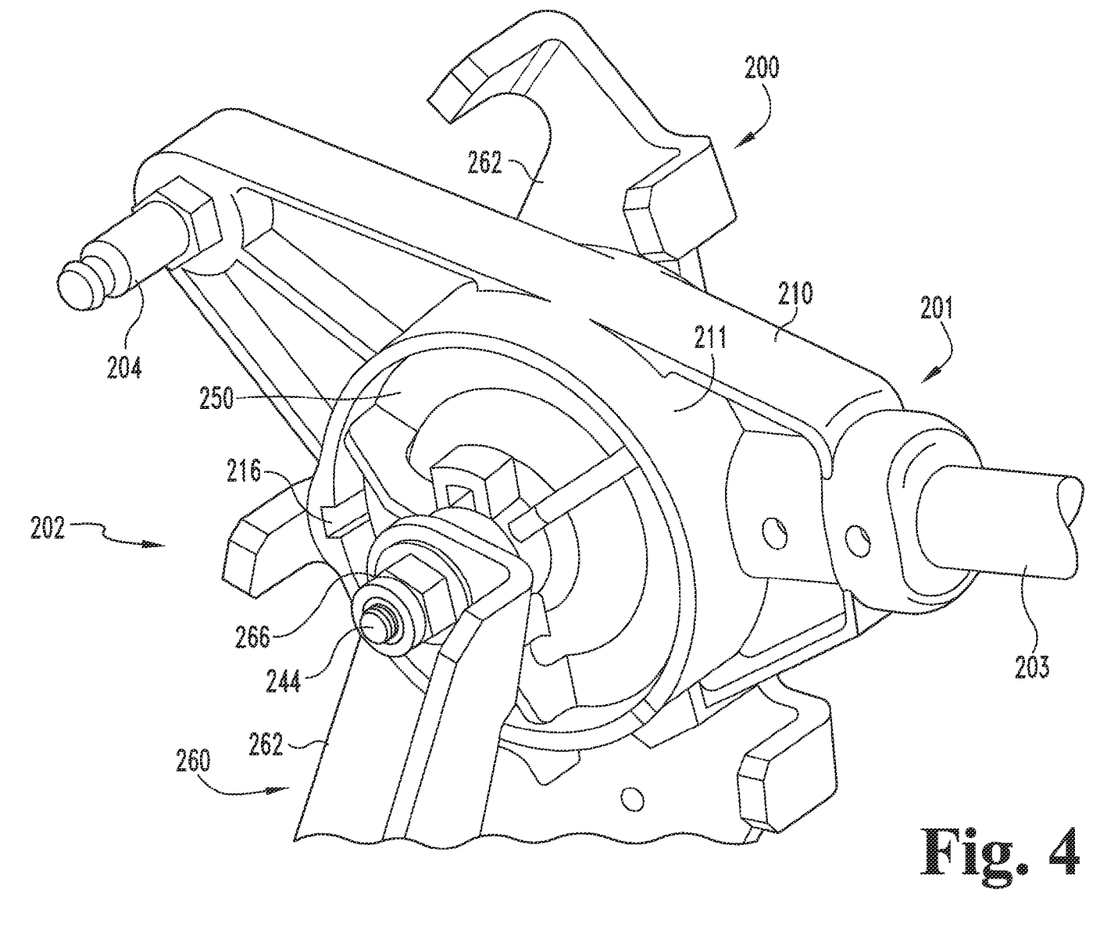
FIG. 4 is a perspective illustration of a selector system according to an embodiment of the invention.
Figure 5:
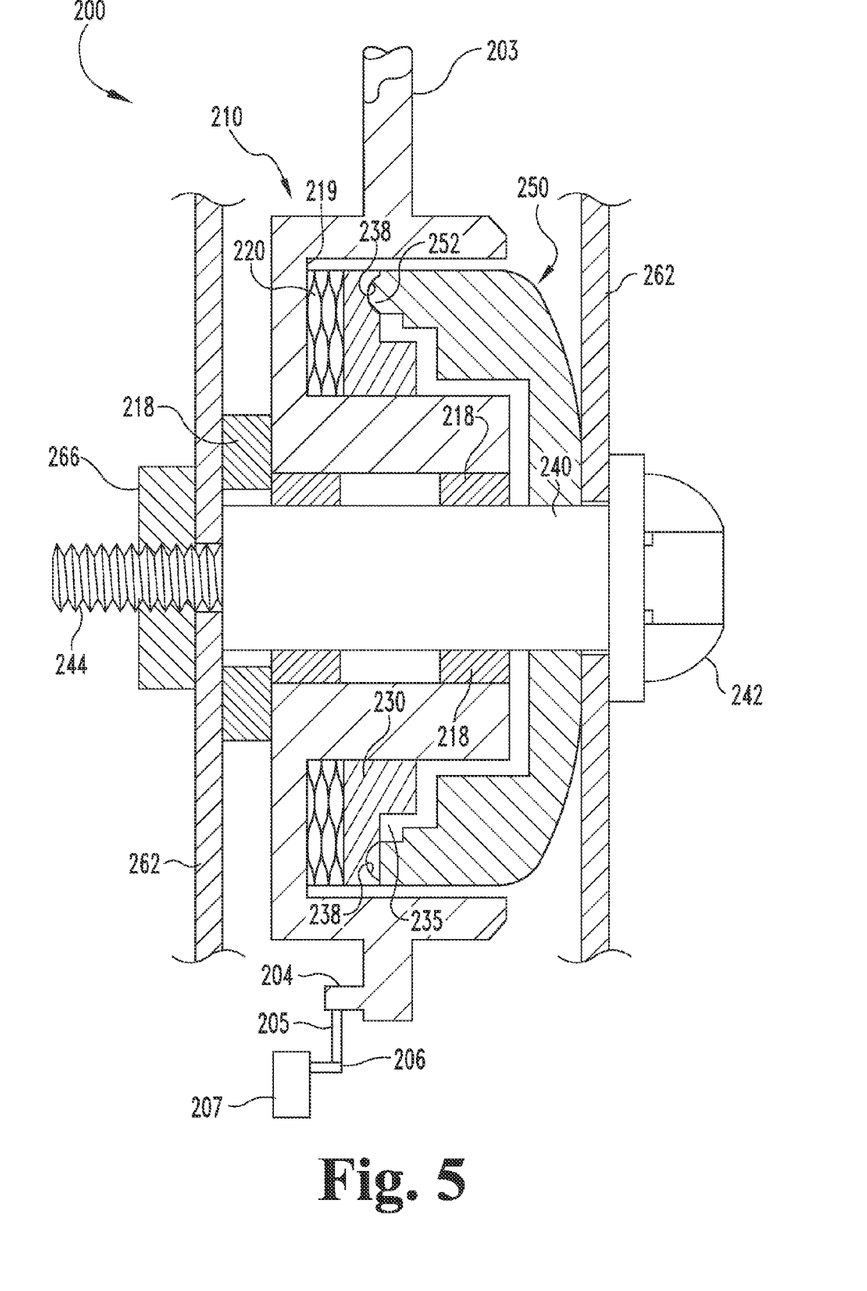
FIG. 5 is a cross-sectional illustration of the selector system of FIG. 4.

It is to be understood that the foregoing description is directed to the exemplary illustrated embodiment, and that any number of variations are also contemplated as within the scope of the invention. One such variation is illustrated in FIGS. 4 and 5, wherein similar reference characters indicate similar elements. The selector system 200 is substantially similar to the embodiment illustrated in FIGS. 1-3; in the interest of conciseness, the following description focuses primarily on features which are different than those described with respect to the selector system 100. The callout numbers in FIGS. 4 and 5 generally relates to the same component in the embodiment illustrated in FIGS. 1 and 2. However, the numbers have been generally increased by 100. For example, the transmission 107 in FIG. 2 corresponds to the transmission 207 in FIG. 5.

In the selector system 200, the housing assembly 201 is rotatably mounted on the shaft 240, and bushings 218 provide a bearing surface upon which the housing 210 can rotate. The shaft assembly 202 is coupled to a mounting assembly 260 configured to secure the selector system 200 to a vehicle or other structure. The shaft assembly 202 may be coupled to the mounting assembly 260 by any appropriate manner. For example, the shaft 240 may pass through openings in mounting arms 262 of the mounting assembly 260, and the shaft 240 may include a hex head 242 and a threaded portion 244 configured to engage a nut 266. Other manners of coupling are of course contemplated as within the scope of the present invention.

The shaft assembly 202 is rotationally fixed with respect to the mounting assembly 260, and the housing assembly 201 is rotatable with respect to the shaft assembly 202. As such, the input crank 203 and the output crank 204 are included in the housing assembly 201. In the illustrated form, the input crank 203 and the output crank 204 are each coupled to the housing 210. It is also contemplated that one or more of the input crank 203 and the output crank 204 may instead be coupled to another element of the housing assembly 201, such as the cam 230. When a user applies an appropriate force to the input crank 203, the housing assembly 201 rotates with respect to the shaft assembly 202. If the user supplies the threshold torque to the follower 250 when the housing assembly 201 is in one of the discrete positions (i.e. when the protrusions 252 are received in the recesses 238), the protrusions 252 engage the recesses 238, urging the cam 230 away from the follower 250 against the biasing member 220 as described above.

Figure 6:
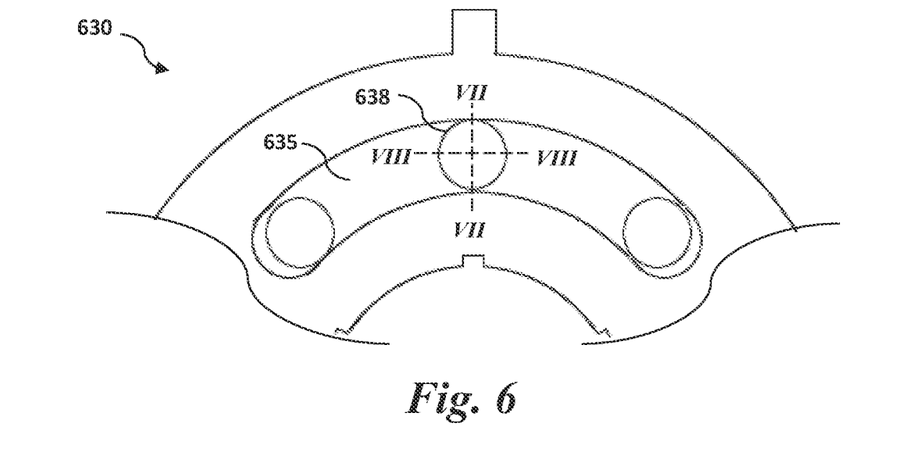
FIG. 6 illustrates a partial schematic of a cam including recesses.
Figure 7:
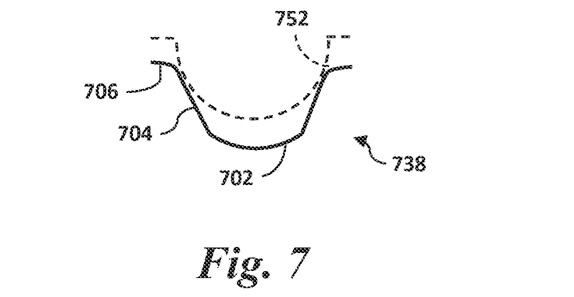
FIGS. 7 and 8 illustrate exemplary profiles of a recess.
Figure 8:
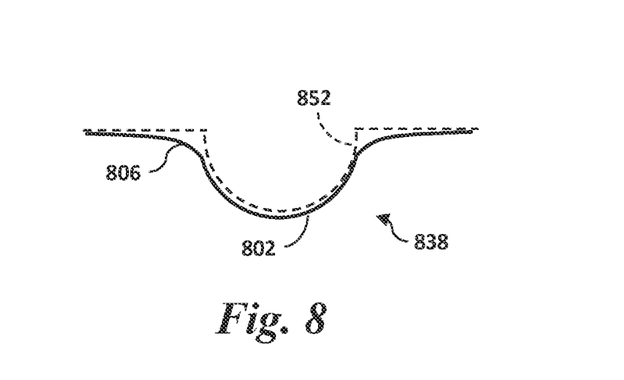

FIG. 6 illustrates a partial schematic of a cam 630 having grooves 635 and recesses 638. Also depicted are cross-sectional line VII-VII, which bisects the recess 638 along a radius of the cam 630, and cross-sectional line VIII-VIII, which bisects the recess 638 and is perpendicular to the cross-sectional line VII-VII. As stated above, the recesses 638 may be of any number of configurations; FIGS. 7 and 8 depict illustrative configurations of the recess 638. FIG. 7 illustrates a first exemplary recess profile 738 taken along the cross-sectional line VII-VII, and FIG. 8 depicts a second exemplary recess profile 838 taken along the cross-sectional line VIII-VIII.

With reference to FIG. 7, a first exemplary recess profile 738 is configured to retain a follower having a protrusion 752 in radial alignment with the cam. The profile 738 includes an arcuate bottom 702 and rectilinear side surfaces 704, which taper outward to curvilinear alignment surfaces 706. Should the follower and the cam become misaligned, the alignment surfaces 706 engage the protrusion 752 to urge the follower and the cam back into alignment.

With reference to FIG. 8, a second exemplary recess profile 838 is configured to retain a protrusion within the recess, and to provide a smooth transition as a protrusion 852 travels into and out of the recess. The recess profile 838 includes an arcuate surface 802 having a radius corresponding to that of the protrusion 852, and a transitional surface 806. The transitional surface 806 is configured to engage the surface of the protrusion 852 such that, as the protrusion 852 travels along the transitional surface 806 and into contact with the arcuate surface 802, the protrusion 852 does not snap into place, which may cause damage to the protrusion 852 or the recess. In certain embodiments, the transitional surfaces 806 may include profiles corresponding to polynomial functions.

Although only exemplary embodiments are illustrated herein, further embodiments include variations which are considered to be within the scope of the invention. For example, in certain embodiments, one or more of the grooves including recesses may be included in the follower, and corresponding protrusions may be included in the cam. In other embodiments, the cam is omitted; one or more of the protrusions and/or one or more of the grooves including recesses are included in the rear wall of the housing, and the corresponding grooves including recesses and/or protrusions are included in the follower. In such embodiments, the follower may be axially movable with respect to the shaft, and a biasing member may urge the follower toward the rear wall. In further embodiments, the shaft may not extend through an opening in the housing.

As can be seen from the foregoing, the inventive selector system divides the range of actuation of the shift lever into a set of discrete positions, and then retains the cable in the user's intended setting. This allows for more cost-effective designs on the actuated end of the control system. Furthermore, the selector system of the present invention generates a majority of the resistive force that the user must overcome to actuate the input crank (for example via a handle or knob). This partial decoupling of force-feedback allows the system's shifting effort to be customized and optimized for an improved user experience. Placing the majority of the resistive force into the input crank also creates a more consistent operator experience, as the shift effort and force feedback are less sensitive to variation in the downstream (actuated) components. A drive selector with force feedback is a significant improvement to customer experience.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A drive selector system comprising:
    a housing having a cavity defined by a rim extending in an axial direction therefrom;
    an inner body with at least one radially outward extending spline positioned within the cavity;
    a biasing member positioned between the inner body and the rim;
    a cam slidingly engaged with the inner body;
    a cam follower engaged with the cam; and
    a shaft rotatably supported through an aperture formed in the inner body and fixed to the cam follower.

2. The drive selector system of claim 1, wherein the cam includes at least one interior notch configured to receive a spline of the inner body therein.

3. The drive selector system of claim 2, wherein the spline prevents relative rotation between the cam and the inner body when engaged with the interior notch.

4. The drive selector system of claim 1, wherein the biasing member engages the cam to urge the cam toward the cam follower.

5. The drive selector system of claim 1, further comprising:
    a plurality of arcuate grooves formed within a face of one of the cam and the cam follower;
    a plurality of recesses corresponding to a defined gear formed in each of the plurality of arcuate grooves; and
    at least one protrusion extending away from a face of the other one of the cam and the cam follower.

6. The drive selector system of claim 5, wherein the at least one protrusion is slidably engageable with one of the plurality of arcuate grooves when a drive selector shifts a transmission between gears; and
    wherein the protrusion is configured to engage within one of the plurality of recesses to correspond with a gear output of the transmission.

7. The drive selector system of claim 5, wherein the at least one protrusion includes an arcuate shape that is substantially similar to an arcuate shape of the recesses.

8. The drive selector system of claim 5, wherein the at least one protrusion and the recesses include arcuate portions and rectilinear portions that form shapes that are different from one another.

9. The drive selector system of claim 1, further comprising:
    an axial channel protruding radially outward from the rim of the cavity; and
    an exterior spline extending from the cam being engageable with the axial channel.

10. A method for the drive selector system of claim 1 comprising:
    moving an input crank between first and second positions, wherein the first position corresponds to a first gear of a transmission and the second position corresponds to a second gear of a transmission;
    biasing the cam follower and the cam toward one another;
    moving the cam follower with respect to the cam between first and second positions in response to the moving of the input crank, wherein the cam follower and cam have one of either a protrusion and a groove slidingly engaged with one another during the moving; and
    wherein the groove includes first and second recessions formed therein corresponding to first and second gears of the transmission.

11. The method of claim 10 further comprising:
applying a threshold force to move the protrusion out of one of the recessions when changing gears in the transmission.

12. The method of claim 11 further comprising:
applying a lesser force than the threshold force to move the protrusion along the groove between recessions.

13. The method of claim 11 further comprising:
moving the cam in an axial direction away from the cam follower in response to the applying of the threshold force.

14. A drive selector system comprising:
a housing having a cavity defined by a rim extending in an axial direction therefrom;
an inner body with at least one radially outward extending spline positioned within the cavity;
a biasing member positioned between the inner body and the rim;
a cam slidingly engaged with the inner body; and
a cam follower engaged with the cam;
a plurality of arcuate grooves formed within a face of one of the cam and the cam follower;
a plurality of recesses corresponding to a defined gear formed in each of the plurality of arcuate grooves; and
at least one protrusion extending away from a face of the other one of the cam and the cam follower.

15. The drive selector system of claim 14, wherein the cam includes at least one interior notch configured to receive a spline of the inner body therein.

16. The drive selector system of claim 15, wherein the spline prevents relative rotation between the cam and the inner body when engaged with the interior notch.

17. The drive selector system of claim 14, wherein the biasing member engages the cam to urge the cam toward the cam follower.

18. The drive selector system of claim 14, further comprising a shaft rotatably supported through an aperture formed in the inner body and fixed to the cam follower.

19. The drive selector system of claim 14, wherein the at least one protrusion is slidably engageable with one of the plurality of arcuate grooves when a drive selector shifts a transmission between gears; and
wherein the protrusion is configured to engage within one of the plurality of recesses to correspond with a gear output of the transmission.

20. The drive selector system of claim 14, wherein the at least one protrusion includes an arcuate shape that is substantially similar to an arcuate shape of the recesses.

21. The drive selector system of claim 14, wherein the at least one protrusion and the recesses include arcuate portions and rectilinear portions that form shapes that are different from one another.

22. The drive selector system of claim 14, further comprising:
an axial channel protruding radially outward from the rim of the cavity; and
an exterior spline extending from the cam being engageable with the axial channel.

* * * * *